United States Patent
Johnson

[15] 3,666,074
[45] May 30, 1972

[54] SAFETY BRAKE FOR PASSENGER CONVEYOR

[72] Inventor: Ernest D. Johnson, Tallmadge, Ohio

[73] Assignee: The Goodyear Tire & Rubber Company, Akron, Ohio

[22] Filed: Apr. 3, 1970

[21] Appl. No.: 25,398

[52] U.S. Cl. ..........................................198/16 R, 198/232
[51] Int. Cl........................................................B65g 15/42
[58] Field of Search................198/16, 232, 17, 18, 195, 196, 198/197; 104/20

[56] References Cited

UNITED STATES PATENTS

| | | | |
|---|---|---|---|
| 1,832,204 | 11/1931 | Healy | 198/232 |
| 834,883 | 9/1906 | Beach | 198/232 |
| 1,729,079 | 9/1929 | Margles et al. | 198/232 |
| 443,488 | 12/1890 | St. Clair | 198/196 |
| 3,288,273 | 9/1966 | Michaelsan et al. | 198/195 |

FOREIGN PATENTS OR APPLICATIONS 340,909    1/1931    Great Britain..........................198/232

*Primary Examiner*—Richard E. Aegerter
*Assistant Examiner*—Douglas D. Watts
*Attorney*—F. W. Brunner and Oberlin, Maky, Donnelly & Renner

[57] ABSTRACT

A belt-constraining channel partially encloses the lower pulley of an inclined belt-type passenger conveyor and has a supporting surface for holding a released portion of the belt and a retaining surface for containing the belt between the channel and the lower pulley. Pivotal support of the channel provides braking engagement of an upper edge of the channel with the belt when the supporting member is depressed by the weight of the released portion of the belt.

3 Claims, 5 Drawing Figures

Patented May 30, 1972
3,666,074
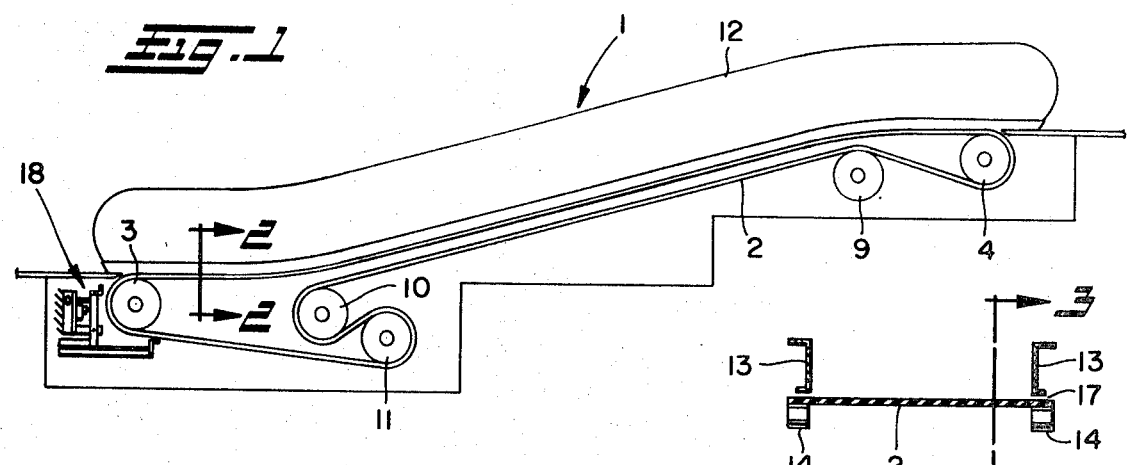
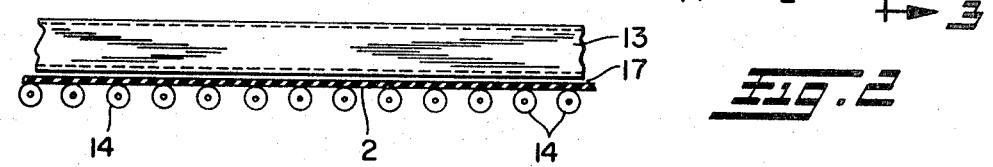
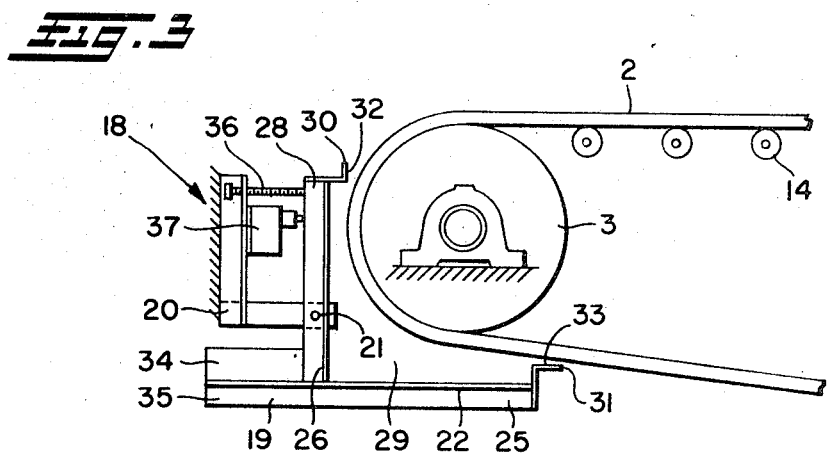
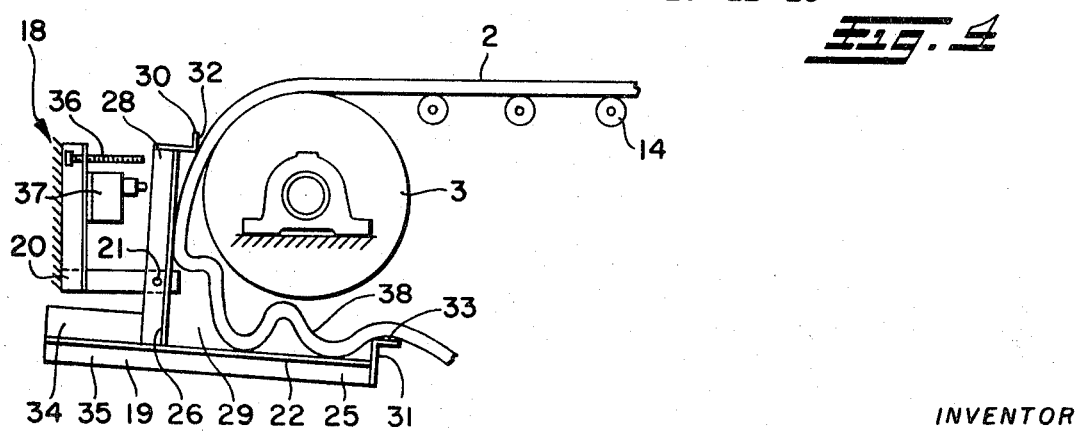
INVENTOR
ERNEST D. JOHNSON
BY
Oberlin, Maky, Donnelly & Renner
ATTORNEYS

SAFETY BRAKE FOR PASSENGER CONVEYOR

This invention relates generally as indicated to a belt-constraining and braking apparatus to prevent unrestricted movement of a belt when excess slack develops due to a malfunction in the conveyor system or a broken belt.

It has been the common practice to provide a brake on the main drive of an inclined belt-type passenger conveyor. The drive and the drive pulleys have been located in a position underneath the conveyor and near the upper end of the conveyor. When a belt breaks or tension in the belt is released because of some other reason, the belt may slide over the drive pulley without any frictional engagement with the drive pulley. Braking of the drive pulley is, therefore, useless. It has also been noticed that when a belt breaks on an inclined passenger conveyor, the break usually occurs in a location near the top of the conveyor and the belt will tend to slide downhill towards the lower end. The belt then continues to slide down over the pulley at the lower end of the conveyor and pile up in the space below the conveyor.

Although the problem is more serious with a broken belt condition, it can be seen that a similar problem exists when there is a malfunction of a belt-support component and the slack side tension on the drive pulley is decreased to a point where the load on the conveyor causes the belt to slide down the conveyor in an uncontrolled manner.

In the conveyance of passengers of all ages and physical conditions, it is important that the movement of the belt be controlled at all times and especially if a belt breaks or some other part of the system does not function so that the conveyor is no longer controlled by the driving pulley and the main brake on the conveyor drive.

With the foregoing in mind it is a principal object of this invention to provide a belt-constraining apparatus which will prevent the belt from sliding down the conveyor in an uncontrolled manner and which will respond belt to a slack-belt condition.

Another object is to provide such a belt-constraining apparatus which operates independently of the other components in the conveyor system.

A further object is to provide a belt retaining member adjacent the lower pulley of the conveyor for receiving a released portion of the belt and holding it in position to prevent further movement of the belt.

Still another object of the invention is to provide for braking the belt by making use of the weight of the released portion of the belt to actuate the brake.

A still further object of this invention is to provide for turning off the conveyor when the belt-constraining apparatus is actuated.

These and other objects of the present invention may be achieved by using a partial enclosure positioned close to but not touching the conveyor belt at the lower pulley of an inclined conveyor. The enclosure has a supporting surface for receiving the released portion of the belt and holding it in position to prevent further movement of the belt. The enclosure is rotatably mounted so that the weight of the belt on the supporting surface of the enclosure will turn the enclosure and urge another portion of the enclosure into braking engagement with the belt. This turning movement trips a switch which controls the conveyor drive.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

In the annexed drawing:

FIG. 1 is a schematic side elevational view of a typical modern passenger conveyor system incorporating the preferred form of belt-constraining apparatus of the present invention.

FIG. 2 is an enlarged fragmentary transverse section taken along the plane of line 2—2 of FIG. 1 showing only the trim plates, belt, and supporting rollers of this conveyor system.

FIG. 3 is an enlarged fragmentary section taken along the plane of line 3—3 of FIG. 2.

FIG. 4 is an enlarged fragmentary side elevation of the belt-constraining apparatus shown in FIG. 1 showing the position of the belt in the normal running condition of the conveyor.

FIG. 5 is a view like FIG. 4 showing the position of the belt in the condition where the belt has broken and made the belt-constraining apparatus operative.

Referring to FIG. 1, there is schematically shown a typical passenger conveyor system 1 having an endless conveyor belt 2 which may be of the type having transverse reinforcing members providing a stiff supporting surface in the transverse direction and flexibility in the longitudinal direction. The conveyor system 1 is inclined and has a lower idler pulley 3 at the lower end and an upper drive pulley 4 at the upper end around which the belt 2 passes between an upper run 5 and a lower run 6. Idler pulley 9 and tension-applying pulleys 10 and 11 are disposed for guiding the lower run 6 and controlling the slack in the belt during normal operations.

Balustrades 12 are also provided on each side of the belt 2 for carrying handrails and have trim plates 13 which overlap the edges of the belt 2 along the length of the balustrades. As shown in FIGS. 2 and 3, rollers 14 are rotatably mounted under the edges of the belt 2 and with the trim plates 13 form slots 17 in which the belt is confined.

A belt-constraining apparatus 18 is located adjacent the lower pulley 3 of the conveyor system 1 and has a belt-retaining member or V-shaped channel 19 pivotally mounted on a stationary frame member 20 about a pin 21 extending transversely of the apparatus and generally parallel to the axis of lower pulley 3. The V-shaped channel 19 has a supporting surface such as plate 22 mounted on a rib 25 extending generally horizontally below the lower pulley 3 and a retaining surface such as plate 26 mounted on a rib 28 extending generally vertically and upwardly from the supporting surface plate 22 in spaced-apart relation to the lower pulley 3. The plates 22 and 26 are fastened together by suitable means such as welding so that the supporting surface plate 22 and retaining surface plate 26 are joined at one transverse edge and converge on the lower pulley 3 towards the other transverse edges to form an enlarged space 29 between the V-shaped channel 19 and the lower pulley. An upper flange 30 projects toward the lower pulley 3 from the edge of plate 22 and a lower flange 31 projects toward the lower pulley from the edge of plate 26. These flanges 30 and 31 may have a right angle cross section to provide rigidity and stiff belt-engaging surfaces 32 and 33 respectively.

The pin 21 about which the V-shaped channel 19 is pivotally mounted extends through the rib 28 and the stationary frame member 20 so that the rib 25 and supporting surface plate 22 are suspended below the pin. It is desirable that the retaining surface plate 26 be in a substantially vertical position and a counterweight 34 may be mounted on an extension 35 of the supporting surface plate 22 to counterbalance the weight of the plate extending below the lower pulley 3.

As best seen in FIG. 4 a screw 36 threaded in the stationary frame member 20 extends horizontally into engagement with the rib 28 for further adjusting the position of the V-shaped channel 19 relative to the lower pulley 3. Switch means such as limit switch 37 may also be mounted on the frame member 20 so that it is normally in engagement with the rib 28 of the retaining surface plate 26. This limit switch 37 is connected to the controls of the passenger conveyor system 1 so that when the rib 28 is moved away from the switch as shown in FIG. 5, the conveyor system will be turned off.

During normal operation of the conveyor system 1 drive pulley 4 is in frictional engagement with the belt 2 and moves the upper run 5 either up or down the inclined conveyor from one end to the other. It is understood that the entrance and exit ends of this conveyor may be interchangeable depending upon the direction in which the belt is moved. In the event of a break in the belt or some other malfunction which decreases the tension in the belt and provides excess slack, the upper run 5 of the belt will slide in the slot 17 over the lower pulley 3 due to the weight of the belt 2 and the weight of any passengers on the belt. As shown in FIG. 5, a released portion 38 of the belt 2 has slipped over the pulley 3 and landed on the supporting surface plate 22 where it has accumulated in a folded condition blocking further movement of the belt over the pulley 3 and through the space between the pulley and the retaining surface plate 26.

The weight of the released portion 38 of the belt on the supporting surface plate 22 will swing the V-shaped channel 19 about the pin 21 in a clockwise direction as seen in FIG. 5 and cause the upper flange 30 and belt-engaging surface 32 to move into braking engagement with the belt 2. Lower flange 31 and belt-engaging surface 33 serve to hold the released portion 38 of the belt on the supporting surface plate 22 and accelerate the accumulation of the belt thereon for more rapid constraining action.

When the V-shaped channel 19 swings in the clockwise direction, as shown in FIG. 5, the rib 28 is moved out of engagement with the limit switch 37 which automatically stops the conveyor system 1.

From the foregoing it can now be seen that the belt-constraining apparatus of this invention is of a relatively simple construction which may be readily installed on a passenger conveyor system. It is particularly effective in constraining and braking the downhill movement of a belt caused by breakage or malfunction of the conveyor system.

While certain representative embodiments and details have been shown for the purpose of illustrating the invention, it will be apparent to those skilled in the art that various changes and modifications may be made therein without departing from the spirit or scope of the invention.

I, therefore, particularly point out and claim as my invention:

1. In an inclined belt-type passenger conveyor a belt-constraining apparatus comprising an upper run for carrying passengers from the entrance end of the conveyor to the exit end and a lower run for returning the belt from the exit end to the entrance end, confining means extending over the edges of said upper run providing slots in which edges of said upper run are confined for restrained movement between said entrance end and said exit end, at least part of said lower run between said exit end and entrance end being unrestrained for freedom of movement of said belt between pulleys engaging said lower run, a pulley for supporting the belt between said upper run and said lower run at the lower end of the conveyor, a belt retaining member disposed adjacent said pulley having a surface for supporting and retaining part of a released portion of said upper run to prevent further movement of said upper run over said pulley independently of the conveyor drive, a belt engaging member mounted on said retaining member adjacent said pulley, connecting means interposed between said belt-engaging member and said surface of said belt-retaining member and said belt-engaging member being urged into braking engagement with said belt upon movement of said released portion of said upper run onto said surface of said belt retaining member through actuation of said belt-engaging member by said connecting means.

2. In a belt-type passenger conveyor a belt-constraining apparatus comprising an upper run for carrying passengers from the entrance end of the conveyor to the exit end and the lower run for returning the belt from the exit end to the entrance end, confining means extending over the edges of said upper run providing slots in which edges of said upper run are confined for restrained movement between said entrance end and said exit end, at least part of said lower run between said exit end and entrance end being unrestrained for freedom of movement of said belt between pulleys engaging said lower run, a pulley for supporting the belt between said upper run and said lower run at the lower end of the conveyor, belt-retaining belt-retaining member disposed in spaced-apart relation to a portion of said belt in an engagement with said pulley, said belt-retaining member having a supporting surface extending below said pulley to hold part of a released portion of said upper run and a retaining surface plate extending upwardly from said supporting surface to confine said part of the released portion of said upper run between said belt-retaining surface plate and said pulley and thereby prevent further movement of said upper run over said pulley independently of the conveyor drive when there is excessive slack in the belt, a belt-engaging member mounted on said retaining surface plate, said belt-retaining member being pivotally supported with the pivot being placed so that the weight of said part of the released portion of said upper run on said supporting surface will turn said retaining surface plate in a direction towards said pulley to urge the belt-engaging member into braking engagement with said belt.

3. The belt-constraining apparatus of claim 2 wherein said retaining surface plate has a belt-engaging flange projecting outward towards said pulley on the upper edge thereof for braking engagement with said belt.

* * * * *